Feb. 5, 1957 — T. R. HALL — 2,780,419

CABLE REEL BRAKE

Filed Feb. 4, 1955

INVENTOR.
Thomas R. Hall
BY
Atty.

United States Patent Office 2,780,419
Patented Feb. 5, 1957

2,780,419

CABLE REEL BRAKE

Thomas R. Hall, Portland, Oreg., assignor to American Truck Equip. Co., Portland, Oreg., a corporation of Oregon Application February 4, 1955, Serial No. 486,200

10 Claims. (Cl. 242—90)

This invention relates to a mechanism for braking the rotation of a cable reel to prevent overrun when a length of cable is being unreeled therefrom.

One object of my invention is to provide a brake mechanism for restraining the rotation of a cable reel with a force proportionate to the combined weight of the reel and the cable remaining on the reel so as to generate a preselected back pressure and to prevent an overrun.

A further object of my invention is to accomplish the above function with a hydraulic mechanism which includes a hydraulic brake, a hydraulic lift motor for the cable reel and a hydraulic pump thereby allowing the invention to be incorporated in existing hydraulic systems at a minimal expense.

An appreciation of the advantages offered by my invention requires, initially, an understanding of an exemplary use to which the mechanism can be put. I have selected, as such an exemplary use, the laying or stringing of a lead cable by a construction crew of a telephone or other utility company. To this end, it will be appreciated that the conventional lead covered telephone cable is provided in huge massive metal or wood reels or spools. Further, the laying or stringing operation requires that the crew unwind the cable from the reel and secure it in place either underground or upon a messenger line intermediate poles. In the latter operation, the messenger line is strung between poles. Thereinafter, the reel of lead covered cable is transported upon a trailer or truck to a position adjacent one end of the messenger line. A lashing or wrapping machine then is fitted to the messenger line and the end of the cable is secured to this machine. Thereinafter, the trailer or truck is moved along causing the lead covered cable to unwind from the reel. At the same time, the lashing machine follows along simultaneously to lift the lead cable and to wrap or lash the messenger line to the cable at spaced points. The instant invention is related to a brake mechanism for controlling the unreeling of the cable and for generating a preselected and a variable back pressure as the cable is drawn from the reel in order to prevent an overrun of the reel and in order to effect the desired precise spacing of the lead cable and messenger line.

Reel carrying trucks and trailers of several sizes and types are a common item of commerce. One of the most popular of the trailers consists of a three wheeled skeletal chassis or framework having vertical arms upon which the axle carrying the cable reel is adapted to rest. Because a full reel is much too heavy for the workmen to lift, these arms include hydraulic lift motors adapted to lift the reel clear of the ground when the cable is to be unwound or the reel is to be transported from place to place. In laying or stringing cable with this trailer, the reel is lifted and the trailer is hitched to a truck. Thereinafter, the truck and trailer are moved in a direction parallel the exemplary overhead messenger wire while the lead cable is payed out and taken aloft by the lashing machine. As will be evident, the massive rotating reel of cable possesses a large momentum. Accordingly, some brake mechanism should be provided both to bring the reel to a stop when the truck and trailer stop and to control the rotation of the reel by exerting a restraining force of preselected magnitude while the cable is payed out. It is because previous cable reel brakes were unsatisfactory that experimentation and research have led me to an improved brake construction and combination and to the subject matter of the instant invention.

To the above ends, my cable reel brake is provided in combination with the hydraulic lift motors which raise the axle carrying the reel of cable. A hydraulic brake is operatively connected with the reel and is joined in common with the conduit to at least one of the hydraulic lift motors. By virtue of this common connection, the hydraulic pressure imposed upon the lift cylinder is identical with that imposed upon the brake cylinder. Accordingly, the braking force restraining rotation of the reel will vary directly as the combined weight of the reel and cable. Initially, when the reel is full and the weight is at a maximum, the inertia of the reel is high and the braking force opposing this rotational inertia also is at a maximum. Later, as some of the cable is payed out, the combined weight of the reel and cable is less, the lever arm of the cable relative to the axis of rotation is less, and the restraining force of the hydraulic brake is correspondingly less. The provision of a combined brake and lift structure allowing this result is an important object of my invention.

The above and other objects and advantages of my invention will become apparent during consideration of the following detailed description, taken in conjunction with the accompanying drawings, wherein.

Figure 1:
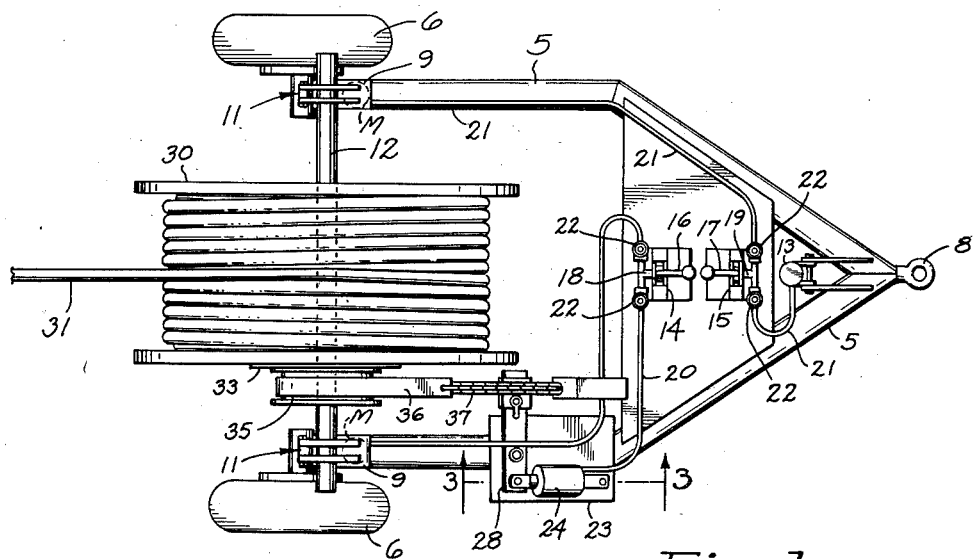
Fig. 1 is a top view of a trailer carrying a reel of cable, the trailer having incorporated therewith the brake mechanism of the instant invention.
Figure 2:
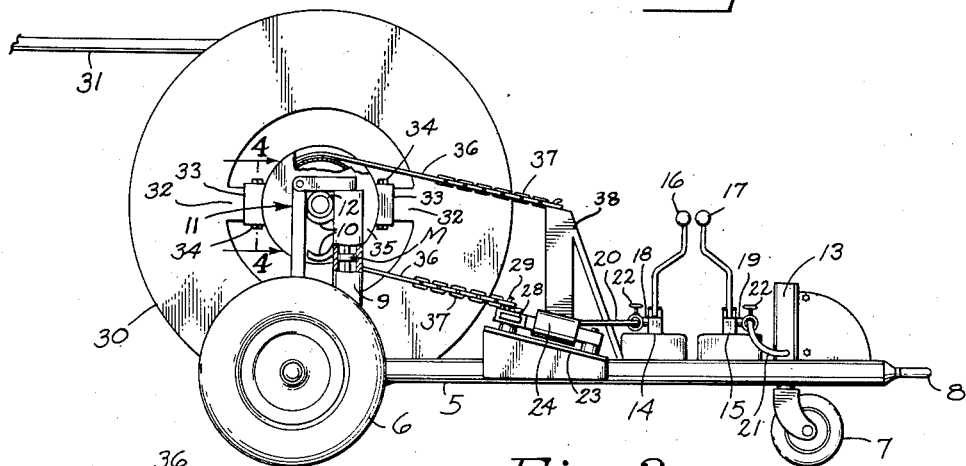
Fig. 2 is a side view of the structure shown in Fig. 1.

The trailer per se of Figs. 1 and 2 is exemplary of the many reel carrying units with which my invention is useful. To this end, it includes a tubular frame 5 having two main wheels 6, a third small wheel 7, and a hitch 8. Special features adapting the trailer for the handling of large cable reels include a pair of lift posts 9 which are mounted one upon each side of the frame. A hydraulic piston and cylinder motor M of conventional construction is arranged vertically within each post 9 so as to cause the post to carry multiple hook members 10 vertically up or down as pressure fluid is supplied to or exhausted from the motor. In addition, a pivotal retention bracket 11 overlies and guards the rear open portion of each hook 10. By this arrangement, the bracket 11 can be swung open, the trailer backed to a position with the wheels 6 straddling a reel 30, and an axle such as the illustrated pipe 12 inserted through the spokes 32. Thereinafter, the bracket 11 is closed and the entire reel lifted clear of the ground by supplying pressure fluid to the hydraulic motors located within the posts 9.

Other structure peculiar to a cable carrying trailer includes a hydraulic piston and cylinder motor 13 upon which the small front wheel 7 is mounted. As hydraulic pressure fluid is supplied to or exhausted from this motor, the small wheel and thus the entire front end of the trailer is raised or lowered. In this manner, a loaded trailer may be manipulated for attachment of the hitch 8 to a truck or for other purposes.

The hydraulic system which is mounted upon the trailer includes a pair of hand operated pumps 14 and 15. These are conventional in construction and it thus will be understood that as the handles 16 and 17 are manipulated, pressure fluid is pumped through the corresponding outlet conduits 18 and 19. By means of appropriate T connections, the supply conduit 18 is joined to a conduit system which I identify by the single reference numeral 20. One branch of this system 20 leads to one of the aforementioned lift motors within the posts 9 and the other branch leads to a hydraulic brake motor 24 hereinafter to be described in more detail. In similar manner, the right hand supply conduit 19 is joined to a hydraulic conduit system 21 one branch of which leads to the lift motor 13 and the other branch of which leads to the second lift motor within a post 9.

Continuing with the hydraulic system, identical manually operated needle valves 22 are inserted in each branch of each system 20 and 21 so as to control flow therethrough in conventional manner. Still further, each of the pumps 14 and 15 carries a built in check valve, release valve and reservoir for the hydraulic fluid. Fluid is pumped from each pump past a check valve and is returned to the reservoir within the pump via a bypass and a release valve. In function, the four valves 22 are opened and the pumps 14 and 15 are manipulated to raise the axle 12, the reel 30, and the front end of the trailer. To effect a holding function, selective ones of the valves 22 may be closed off thereby retaining the pressure within the desired branch line. To lower the motors, the appropriate ones of the valves 22 may be opened and the release valve within the pump also opened thereby returning pressure fluid to the reservoir within the pump via the bypass.

Referring now to the details of the brake mechanism per se, a mounting platform 23 is secured to the frame 5. Thereinafter, the hydraulic piston and cylinder motor 24 is fixed to the platform 23. This motor consists of a piston 25 (see Fig. 3) having an internal return spring 26 and a piston rod 27. The end of the movable piston rod 27 is secured to a pivot plate 28 (see Fig. 1) the opposite end of which carries a hook or horn 29 (see Fig. 2). Actuation of the brake motor 24 is effected by supplying or exhausting hydraulic fluid through the appropriate branch of the hydraulic conduit 20. This, in turn, reciprocates the piston rod 27 thereby pivoting the plate 28 to move the hook 29 fore and aft in response.

Figure 4:
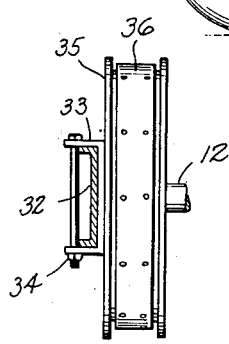
Fig. 4 is an enlarged section taken on the line 4—4 of Fig. 2 showing the connection of the brake drum and band with a spoke element of the reel.
Figure 3:
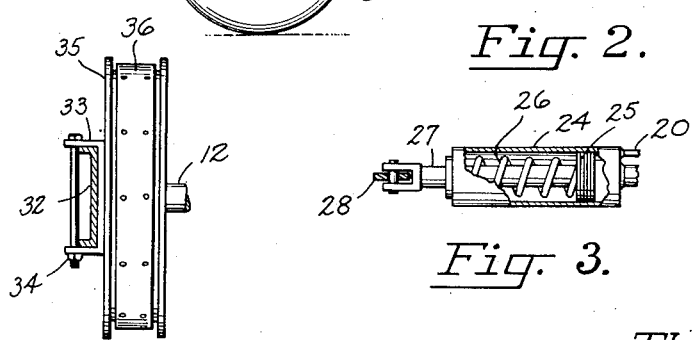
Fig. 3 is a detail view, partially broken away and taken substantially on the line 3—3 of Fig. 1, showing the hydraulic piston and cylinder motor which actuates the hydraulic brake.

Referring more particularly to Figs. 1 and 2, I have shown the cable reel 30 with a length of heavy lead covered cable 31 wound thereabout. As is conventional, the reel 30 carries multiple spoke members 32 and the axle 12 rotatably is accommodated in apertures formed through these spokes. As cable is unwound, the spokes and the reel rotate upon the axle member 12. To restrict or brake this rotation and thus to effect a control of the force required to pull the cable from the reel, I control the speed of the unreeling operation. This is done with the brake motor which is shown in Fig. 3 and the brake drum and band mechanism shown in Fig. 4.

To the above end, a long piece of channel 33 is formed so as to straddle one of the spokes 32. The nut and bolt structure 34 detachably secures this channel to the spoke. A brake drum 35 is welded to the channel member 33 for rotation therewith and a length of flexible brake band 36 is wrapped about the drum. Each end of the brake band 36, in turn, is fixed to a length of chain 37. One link of the lower chain 37 is looped over the hook or horn 29 to which the brake motor is connected. The upper chain 37 has a link hooked over a similar horn carried by an upstanding bracket 38 which is welded to the frame 5. By utilizing multiple link chains, the initial tension of the brake band 36 upon the drum 35 can be adjusted simply by selecting an appropriate one of the links to hook over the corresponding horn or hook structure. Thereinafter, as the brake motor 24 is actuated, the pivot plate 28 causes the brake band to be tightened about the drum in accord with the hydraulic pressure.

In an exemplary use of the brake mechanism and trailer, it will be assumed that a telephone crew is stringing lead covered cable between poles. A typical lead covered cable 31 may be up to an inch and a half in diameter and may carry either coaxial tubes or many hundreds or thousands of pairs of small wires. As is known, the cable is supplied upon large spools or reels such as that illustrated at 30. After delivery of the reel at the supply depot, a cable reel trailer is backed up to the reel with the wheels 6 straddling the reel. A pipe or axle member 12 then is inserted through the appropriate apertures in the spokes 32. The ends of this axle member are positioned adjacent two of the hooks 10, the valves 22 manipulated, and the pumps 14 and 15 actuated through the handles 16 and 17 to raise the reel of cable clear of the ground. The valves leading to the branch lines controlling the lift motors M in 9 then are closed off to hold the reel in the elevated position and the hydraulic pumps further manipulated to raise or lower the front end of the trailer while the hitch 8 is secured to the truck. The small front wheel 7 then is retracted and the entire trailer, carrying the reel of cable, is taken to the point of use.

At the site where the cable is to be strung, a steel messenger line first is strung intermediate the poles. It is the function of this messenger line to carry and to support the lead cable 31. A lashing machine of conventional construction is mounted upon the messenger line and the free end of the lead cable 31 is fed through the funnel shaped nose or mouth of the lashing machine. A rope line or the like then is connected from the truck to the lashing machine, both of the valves 22 in the conduit 20 are opened, and the truck is driven down the road parallel to the messenger line. As the truck moves, of course, the reel 30 rotates upon the axle 12 and the cable 31 unreels or unwinds from about the reel. At this point, an important feature of my invention comes into play.

To the above end, it will be appreciated that steel and lead have different coefficients of expansion, that of lead being approximately two and one half times that of steel. Accordingly, the tension in the lead cable must be kept constant and the connection of the cable to the steel messenger line must be done with a precise and an exact spacing. It thus is of primary importance that a constant tension be exerted at all times upon the lead cable as it unwinds from the reel in response to the pull of the lashing machine. To this end, it will be noted that the brake motor 24 and one of the lift motors 9 are joined in common by the hydraulic conduit 20. Thus, the hydraulic pressure existing within the cylinders of both of these motors is kept identical while the cable is payed out. This identical pressure produces a braking action or restraint upon the rotational unreeling of the cable with a force which is proportionate to the combined weight of the reel and the cable remaining on the reel. This in turn generates a preselected back pressure and prevents an overrun of the reel during operation.

Initially, of course, the combined weight of the cable and reel are great and the pressure within the hydraulic conduit 20 reacts upon the piston 25 to apply a large braking force through the brake band 36 and drum 35. At the same time, the lever arm of the unwinding cable is at a maximum since the cable is being peeled off at the periphery of the reel. On the other hand, as the cable is unreeled, the lever arm decreases as does the total weight of the cable and reel. With my novel brake mechanism, this decrease in weight generates a decrease in the braking force applied through the brake motor 24 to the band 36 and drum 35. Expressed differently, the brake motor restrains the rotation of the cable reel with a force which varies as the hydraulic pressure within the cylinder of the brake motor and the lift motor. Further, by employing different links in the chains 37, cable reels of varying size can be accommodated and the initial tension upon the brake band adjusted. These coacting structures form the subject matter of my invention.

In summary, I have provided an inexpensive and a simple brake for a cable reel, the operation of the brake being automatic so as to eliminate the need for a brake operator during the stringing or laying of cable. This brake mechanism is capable of preventing an overrun or an inadvertent unreeling of the cable even when abrupt or sudden halts are required. At the same time, the brake restrains the rotation of the cable reel with a force proportionate to the mass of the reel in order to generate a preselected back pressure and thus to assure a correct and a precise lashing of the lead cable to a steel messenger line.

I claim:

1. In combination with a reel of cable mounted for rotation about an axle member, hydraulic lift means for lifting said reel and axle, and hydraulic brake means operatively connected with said reel and hydraulically joined in common with said hydraulic lift means to restrain rotation of the reel during unreeling of the cable with a braking force which varies directly with the combined weight of the reel and cable.

2. A brake mechanism for restraining the rotational unreeling of a cable reel with a force proportionate to the combined weight of the reel and the cable remaining on the reel so as to generate a preselected back pressure and prevent an overrun, said mechanism comprising, hydraulic piston and cylinder lift motor means adapted to lift and to support a reel, and hydraulic piston and cylinder brake motor means adapted to restrain rotation of the same reel, said motors being joined in common to hydraulic conduit means such that the pressure in both motor cylinders is the same.

3. In a brake mechanism for restraining the rotational unreeling of a cable reel with a force proportionate to the combined weight of the reel and the cable remaining on the reel so as to generate a preselected back pressure and prevent an overrun, a hydraulic lift motor means for lifting a reel and a hydraulic brake motor means for restraining rotation of said reel joined in common to a hydraulic conduit means such that the hydraulic pressure in both said hydraulic motors is the same, and valve means selectively to restrict, block off, or permit flow to or from either or both of said hydraulic motors.

4. In combination, a rotatable carrier upon which a length of cable is wound, hydraulic means for supporting said carrier vertically clear of the ground, said means including a hydraulic pump joined by a hydraulic conduit to a hydraulic lift motor, and hydraulic brake means connected with said hydraulic conduit and operatively bearing upon said carrier to restrain the rotation thereof as said cable is unwound from thereabout.

5. In combination with a rotatable carrier upon which a length of cable is wound, hydraulic lift means for lifting said carrier vertically, said lift means including a hydraulic pump joined by a hydraulic conduit to a hydraulic lift motor, hydraulic brake means operatively bearing upon said carrier to restrain the rotation thereof as said cable is unwound from thereabout, said brake means including a hydraulic brake motor connected with said hydraulic conduit, and valve means controlling said hydraulic conduit selectively to restrict, block off, or permit flow to or from either or both of said hydraulic motors.

6. A device for restraining the rotation of a cable reel, comprising motor means adapted to lift and to support a cable reel, brake motor means adapted for operative connection with the same cable reel to restrain the rotation thereof, said brake means including a circular brake drum and band having adjustment means independent of the brake motor for varying the initial tension in the brake band, and means joined to both said motors to apply a braking force proportionate to the weight supported by said first mentioned motor.

7. In combination with a portable trailer, a cable reel having spoke means rotatably carrying a lateral axle member, a circular brake drum detachably secured to said spoke for rotation therewith, a brake band encircling and bearing upon said brake drum, brake motor means carried by said trailer and detachably engageable with said brake band selectively to increase or decrease the braking force applied to said brake drum, lift motor means carried by said trailer and adapted to lift and to support said lateral axle member, and means carried by said trailer and joined to both said brake motor and said lift motor to apply a braking force proportionate to the weight carried by said lift motor.

8. A device for restraining the rotation of a cable reel with a variable braking force as the cable is unreeled, comprising hydraulic piston and cylinder motor means adapted to lift and to support a cable reel, hydraulic piston and cylinder brake motor means adapted for operative connection with the same cable reel to restrain rotation thereof with a force which varies as the hydraulic pressure within the cylinder of the brake motor, hydraulic conduit means joined to both said brake motor and said lift motor to conduct an equal hydraulic pressure to both motor cylinders, and hydraulic pump means joined to said hydraulic conduit selectively to supply hydraulic fluid at a preselected pressure thereto.

9. In combination, a cable reel having spoke means rotatably carrying a lateral axle member, a circular brake drum detachably secured to said spoke for rotation therewith, a brake band encircling and bearing upon said brake drum, hydraulic piston and cylinder brake motor means detachably engageable with said brake band selectively to increase or decrease the braking force applied to said brake drum, hydraulic piston and cylinder lift motor means adapted to lift and to support said lateral axle member, adjustment means independent of said brake motor for varying the initial tension in said brake band, a hydraulic conduit means joined to both said brake motor and said lift motor to conduct an equal hydraulic pressure to both motor cylinders, hydraulic pump means joined to said hydraulic conduit to supply hydraulic fluid at a preselected pressure thereto, and separate valve means intermediate said brake motor and pump and intermediate said lift motor and pump to control hydraulic flow through said conduit.

10. In combination, means for raising and holding a reel of cable clear of the ground, and brake means operatively connected with said reel and with said first mentioned means to restrain rotation of the reel during unreeling of the cable, said first mentioned means and said brake means having a common power applying means to apply a braking force which varies directly with the combined weight of the reel and cable.

References Cited in the file of this patent
UNITED STATES PATENTS

| | | |
|---|---|---|
| 993,550 | Robeson | May 30, 1911 |
| 1,383,953 | James | July 5, 1921 |
| 1,832,446 | Boe | Nov. 17, 1931 |
| 1,939,055 | Johnson | Dec. 12, 1933 |
| 2,533,782 | Fischer | Dec. 12, 1950 |
| 2,635,827 | Stemm et al. | Apr. 21, 1953 |